United States Patent
Han et al.

(10) Patent No.: US 10,276,925 B2
(45) Date of Patent: Apr. 30, 2019

(54) WATCH WITH SLOT ANTENNA CONFIGURATION

(71) Applicant: Garmin Switzerland GmbH, Schaffhausen (CH)

(72) Inventors: Yaoxuan Han, Olathe, KS (US); Adam B. Rasmussen, Overland Park, KS (US); Christopher J. Hanshew, Lenexa, KS (US); Kevin M. Hansen, Overland Park, KS (US)

(73) Assignee: Garmin Switzerland GmbH (CH)

( * ) Notice: Subject to any disclaimer, the term of this patent is extended or adjusted under 35 U.S.C. 154(b) by 21 days.

(21) Appl. No.: 15/473,187

(22) Filed: Mar. 29, 2017

(65) Prior Publication Data

US 2018/0287248 A1    Oct. 4, 2018

(51) Int. Cl.

| H01Q 1/24 | (2006.01) |
|---|---|
| H01Q 1/27 | (2006.01) |
| H04B 1/3827 | (2015.01) |
| H01Q 13/18 | (2006.01) |
| H01Q 1/38 | (2006.01) |
| H01Q 1/48 | (2006.01) |
| H01Q 9/04 | (2006.01) |

(52) U.S. Cl.
CPC .............. *H01Q 1/273* (2013.01); *H01Q 1/38* (2013.01); *H01Q 1/48* (2013.01); *H01Q 9/0414* (2013.01); *H01Q 13/18* (2013.01); *H04B 1/385* (2013.01)

(58) Field of Classification Search
CPC ...... H01Q 1/243; H01Q 1/273; H01Q 9/0421; H01Q 13/10; H01Q 7/00; H01Q 9/0407; H01Q 1/52; H01Q 13/18; H01Q 1/42; H01Q 5/30; H01Q 5/35; H01Q 13/106

USPC .................................................. 341/718, 702
See application file for complete search history.

(56) References Cited

U.S. PATENT DOCUMENTS

| 5,559,760 A * | 9/1996 | Schneider .............. G04G 21/04 368/10 |
|---|---|---|
| 5,757,326 A | 5/1998 | Koyama et al. .............. 343/702 |

(Continued)

OTHER PUBLICATIONS

Printout from http://www.antenna-theory.com/antennas/aperture/slot.php; published prior to Mar. 29, 2017.

(Continued)

*Primary Examiner* — Linh V Nguyen
(74) *Attorney, Agent, or Firm* — Samuel M. Korte; Max M. Ali

(57) ABSTRACT

A wrist-worn electronic device includes a side wall formed of electrically nonconductive material, a printed circuit board, a location determining element, a bezel, and a first antenna. The location determining element is configured to receive a first electronic signal and determine a current geolocation of the electronic device. The bezel is formed of electrically conductive material, positioned above the nonconductive side wall, such that a nonconductive slot is formed between the bezel, a perimeter of the printed circuit board, and electrical connections to two of the electrical ground terminals on the printed circuit board. The first antenna is formed at least partially by an upper portion corresponding to a circumference of the bezel between the two electrical ground terminal and configured to wirelessly receive the first electronic signal and communicate the first electronic signal to the location determining element.

29 Claims, 11 Drawing Sheets

(56) References Cited

U.S. PATENT DOCUMENTS

| | | | | |
|---|---|---|---|---|
| 6,028,561 | A | 2/2000 | Takei | 343/767 |
| 7,327,324 | B2 | 2/2008 | Wang | 343/767 |
| 7,612,725 | B2 | 11/2009 | Hill et al. | 343/702 |
| 2005/0219955 | A1* | 10/2005 | Xu | G04G 21/04 368/88 |
| 2013/0181873 | A1 | 7/2013 | Gutschenritter et al. | |
| 2014/0225786 | A1* | 8/2014 | Lyons | H01Q 1/273 343/702 |
| 2014/0266920 | A1* | 9/2014 | Tran | H01Q 1/243 343/702 |
| 2015/0255855 | A1 | 9/2015 | Tsai et al. | |
| 2015/0349410 | A1* | 12/2015 | Russell | H01Q 1/273 343/702 |
| 2016/0006110 | A1* | 1/2016 | Jain | H01Q 5/328 343/702 |
| 2016/0013544 | A1 | 1/2016 | Lyons et al. | |
| 2016/0056533 | A1* | 2/2016 | Nissinen | H01Q 9/0421 343/702 |
| 2016/0308272 | A1* | 10/2016 | Standke | H01Q 1/243 |
| 2017/0018842 | A1* | 1/2017 | Sano | H01Q 1/273 |
| 2017/0033439 | A1 | 2/2017 | Liu et al. | |
| 2017/0358850 | A1* | 12/2017 | Vanjani | H01Q 5/30 |
| 2017/0373381 | A1* | 12/2017 | Robinson | H01Q 1/273 |
| 2018/0129170 | A1* | 5/2018 | Yun | H01Q 5/364 |

OTHER PUBLICATIONS

Printout from http://www.antenna-theory.com/antennas/aperture/ifa.php; published prior to Mar. 29, 2017.

International Search Report and Written Opinion from corresponding PCT/US2018/025146, filed Mar. 29, 2018.

* cited by examiner

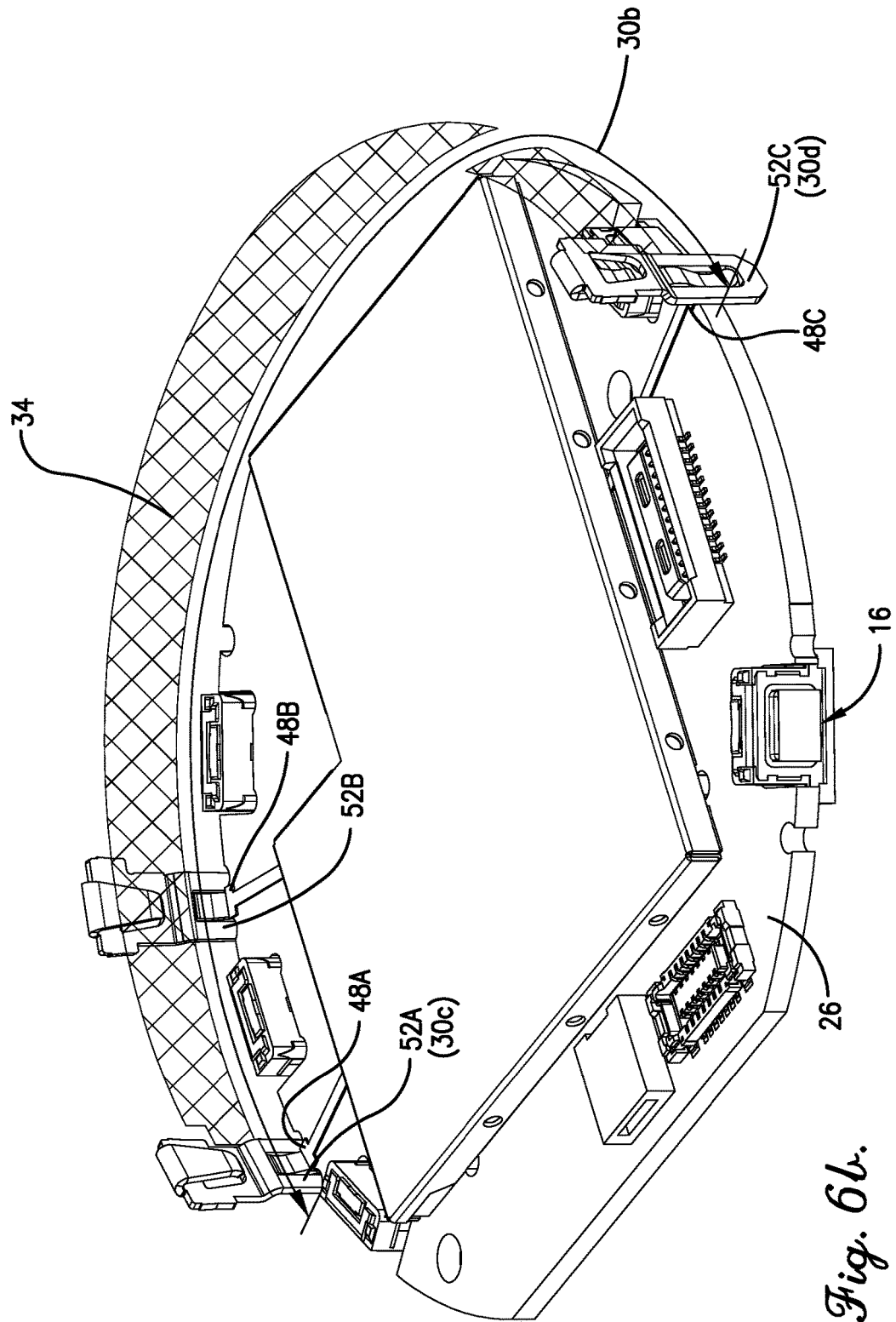

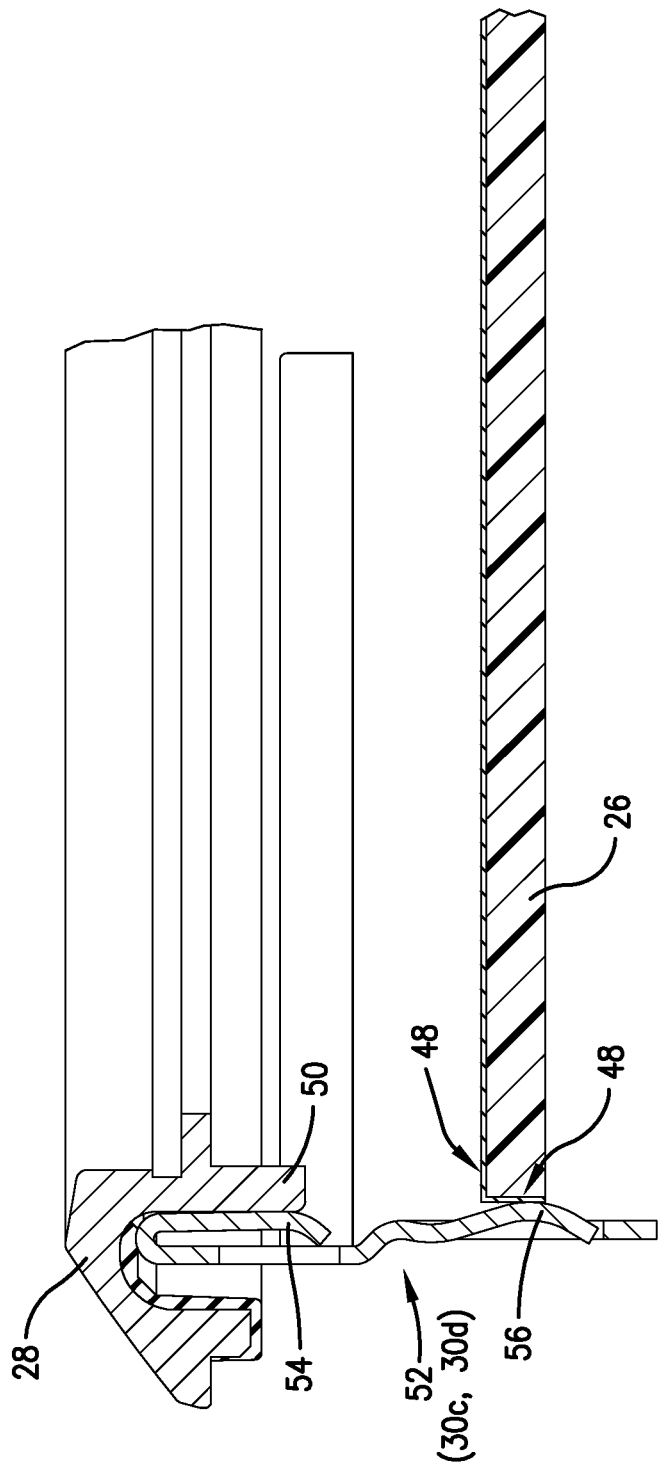

WATCH WITH SLOT ANTENNA CONFIGURATION

BACKGROUND

Wrist-worn electronic devices often include functionality that may be used to track a user's current location, distance traveled, velocity, and other performance metrics or data. This functionality may be provided by wirelessly receiving positional information from a satellite-based positioning system such as the global positioning system (GPS). In addition, such devices may communicate wirelessly with other electronic devices, systems, or networks using communication protocols such as Bluetooth™, Wi-Fi™, or cellular signals. One or more antennas may be included in the electronic devices to wirelessly receive signals from GPS satellites and provide wireless communication with other electronic devices, systems, or networks.

The bezel of some conventional wrist-worn electronic devices may partially form an antenna that wirelessly transmits or receives electronic signals. This principle has been used heretofore in wrist-worn electronic devices, such as watches, having a housing, bezel, and an antenna configured to transmit and receive signals communication systems or devices (e.g., Bluetooth™, Wi-Fi™, ANT™, etc.) and/or receive location signals from a satellite-based positioning system (e.g., GPS), where the antenna is integrated with at least a portion of the bezel and coupled with a conductive component at least partially positioned in an internal cavity of the housing. As disclosed in U.S. Pat. No. 9,172,148, the antenna may be capacitively coupled with the conductive component positioned in the internal cavity of the housing. As disclosed in U.S. Pat. No. 9,257,740, the antenna may be electrically connected to a second antenna at least partially enclosed within the internal cavity of the housing.

The antenna or a portion thereof may include an inverted-F configuration, which typically includes an upper arm (radiating leg), a signal feed connection to the upper arm from a ground plane, and a shorting pin connection to the upper arm electrically grounding the upper arm at the location of the shorting pin connection. The two connections to the upper arm (for the signal feed and the shorting pin) results in a configuration having an open end opposite the location of the shorting pin connection. The length of an inverted-F antenna is typically measured using the length of the upper arm from the open end to the opposite end of the upper arm, which is typically the location of the shorting pin connection. The length of the upper arm is commonly one-fourth (one-quarter) of a wavelength of an electrical signal transmitted or received by the inverted-F antenna. The signal feed connection to the upper arm is typically closer to the shorting pin connection than the open end of the inverted-F antenna. However, the location of the signal feed connection may be switched with the location of the shorting pin connection, such that the open end is opposite the location of the signal feed connection.

Some conventional wrist-worn electronic devices may include a housing and a slot antenna to transmit and receive communication signals or receive locations. However, the slot antenna is located entirely within the electronic device housing. For instance, the slot may be formed using a plastic carrier or a plurality of vertical supports positioned on the printed circuit board. Other antenna configurations utilize a slot formed from or within an opening defined by a ground plane and a bezel. Specifically, the ground plane may have a slot (opening) and one or more antenna resonating elements may be formed above the slot to increase the distance between the resonating elements and the ground plane. If a printed circuit board of a device forms at least a portion of a ground plane of an antenna, the slot may be formed within the printed circuit such that it may be visible from a top view of the device.

SUMMARY

Embodiments of the present technology provide a wrist-worn electronic device configured to accommodate an antenna formed by a portion of a bezel having electrical connections to an electronic signal terminal and two electrical ground terminals. The electronic device may utilize an electrically conductive bezel, a printed circuit board providing a ground plane, and electrical connections to two electrical ground terminals to form a nonconductive slot. The antenna may be electrically coupled with a location determining component or a communication element to transmit or receive electronic signals to determine a current geographic location or allow wireless communication with other electronic devices.

The electronic device may broadly comprise a housing, a display, a printed circuit board, a location determining element, a bezel, and a first antenna. The housing may include a lower surface configured to contact a wearer's wrist, a side wall formed of electrically nonconductive material and an opposing upper surface, that together form an internal cavity. The display may be positioned adjacent to the upper surface of the housing. The printed circuit board may be positioned in the internal cavity and may include a plurality of electrical ground terminals and a first electronic signal terminal. The location determining element may be positioned on the printed circuit board and configured to receive a first electronic signal and determine a current geolocation of the electronic device using the first electronic signal.

The bezel may be formed of electrically conductive material and may be positioned above the nonconductive side wall along a perimeter of the display and printed circuit board such that the bezel and the printed circuit board are separated by the nonconductive side wall. The bezel may be electrically connected to two of the electrical ground terminals and a first electronic signal terminal. The bezel, nonconductive side wall, and electrical connections to the two of the electrical ground terminals may be positioned such that a nonconductive slot is formed between the bezel, a perimeter of the printed circuit board, and the electrical connections to the two of the electrical ground terminals. The first antenna may be formed at least partially by a first portion of a circumference of the bezel between the two of the electrical ground terminals. The first antenna may be configured to wirelessly receive a first electronic signal and communicate the first electronic signal to the location determining element.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present technology will be apparent from the following detailed description of the embodiments and the accompanying drawing figures.

BRIEF DESCRIPTION OF THE DRAWING FIGURES

Embodiments of the present technology are described in detail below with reference to the attached drawing figures, wherein:

FIG. 6B is a top perspective view of a portion of the electronic device of FIG. 1 illustrating the printed circuit board and a plurality of spring contacts, portions of which form first and second antennas, without the bezel obstructing said components in FIG. 5;

FIG. 8 is a vertical side sectional view cut along the line 7-7 from FIG. 5 illustrating the electrical connection between a tab of the bezel, one spring contact, and a terminal of the printed circuit board;

Figure 1:
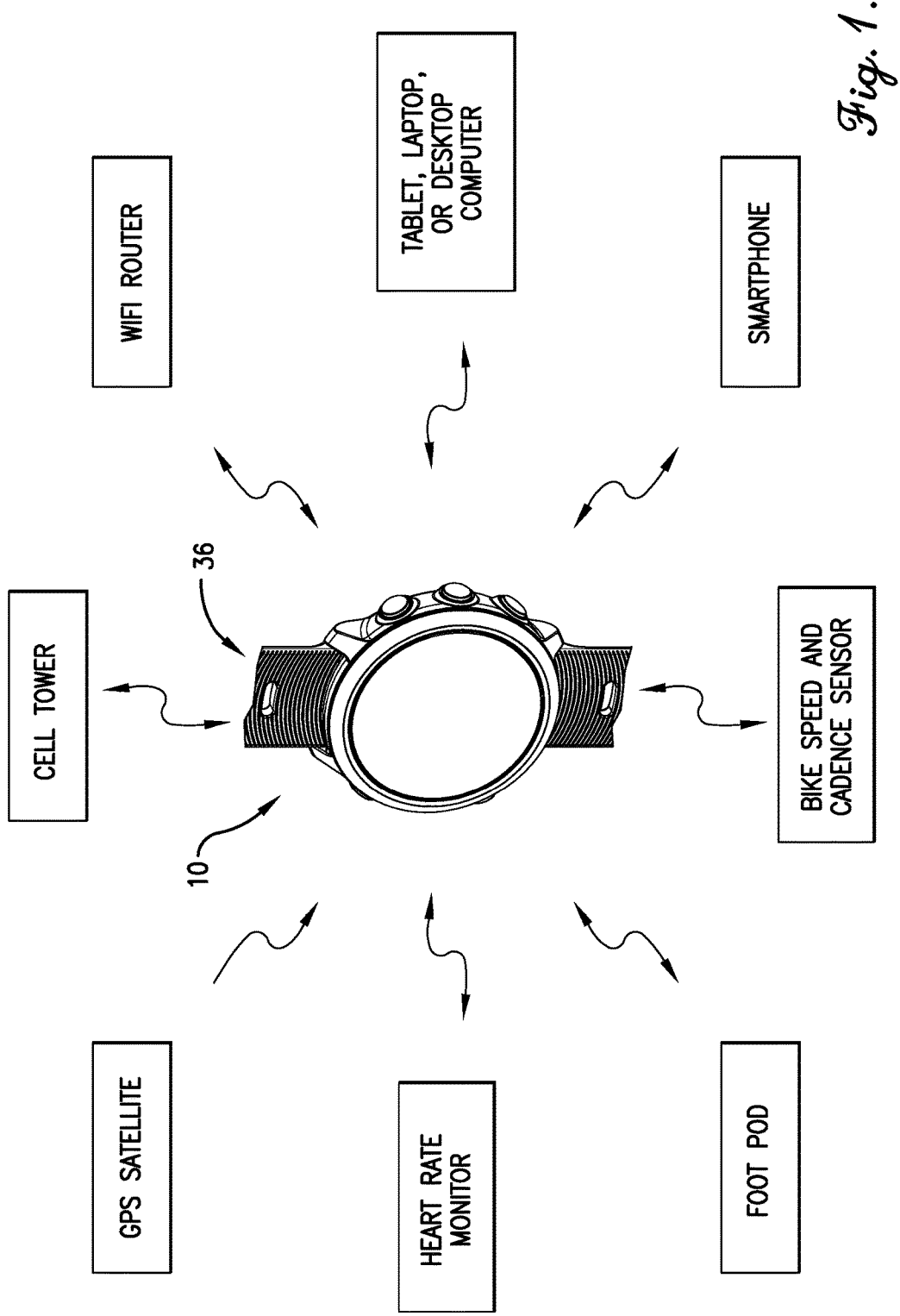
FIG. 1 is an environmental view of a wrist-worn electronic device incorporating an improved antenna configuration, constructed in accordance with embodiments of the present technology, depicting a plurality of other devices or systems with which the electronic device may communicate.

The drawing figures do not limit the present technology to the specific embodiments disclosed and described herein. The drawings are not necessarily to scale, emphasis instead being placed upon clearly illustrating the principles of the technology.

DETAILED DESCRIPTION

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the present technology. The following detailed description is, therefore, not to be taken in a limiting sense. The scope of the present technology is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Embodiments of the present technology provide an electronic device that can be worn on a user's wrist and that includes an improved antenna design. The electronic device may be a watch, a wrist-worn smart phone, a wrist-worn navigation device, or other wearable multi-function electronic devices that include a housing and a wrist band, strap, or other attachment mechanism to secure the electronic device to a user's wrist. The electronic device may include a housing including a lower surface configured to contact a user's wrist, a side wall, an opposing upper surface, that together form an internal cavity. Although the electronic device is typically worn on a wrist, it may also be worn on other parts of the body such as the forearm or the upper arm. The user wearing the electronic device may be involved in activities such as street running, trail running, jogging, hiking, walking, biking, swimming, exercising, etc. During these activities, the electronic device may monitor the user's current location, distance traveled, velocity, and other performance metrics by receiving wireless location signals from a satellite-based positioning system such as the global positioning system (GPS). In addition, the electronic device may be wirelessly paired with other devices such as a heart rate monitor worn around the user's chest, a foot pod attached to the user's shoe for measuring jogging or running cadence and distance, a bike speed and cadence sensor attached to a crank arm and wheel hub of the user's bicycle for tracking biking performance, and so forth. Furthermore, the electronic device may be able to communicate with smartphones, tablets, laptop or desktop computers, Wi-Fi routers, cell towers, and the like to allow the user to upload activity data, download apps, receive text messages, emails, and weather alerts, and so on.

Embodiments of the electronic device may include a printed circuit board, a bezel, and a first antenna. The printed circuit board may retain electronic components which process electronic signals and may include a plurality of electronic signal terminals operable to provide a signal feed and a plurality of electrical ground terminals operable to provide electrical ground.

The printed circuit board may provide a ground plane for one or more antennas, including the first antenna. A perimeter of the printed circuit board may be positioned adjacent to a side wall of the housing. The circuit board may be positioned within the internal cavity enclosed by a circular lower surface. The circuit board may be substantially circular, rectangular, or square in shape. In embodiments, the circuit board may have an irregular shaped such that it is partially circular and partially rectangular. The partially circular portion of the circuit board may include a plurality of electrical ground terminals and a first electronic signal terminal and may be positioned such that the perimeter of the circular portion is positioned adjacent to a side wall of the housing.

The bezel may be electrically connected to two of the electrical ground terminals and the electronic signal terminals operable to provide a signal feed (F). The bezel may be formed from electrically conductive material and any surface of the bezel may be electrically coupled with an electrically conductive spring contact. In embodiments, each electrical connection may be provided by a combination of an electrically conductive tab extending from a surface of the bezel, an electrically conductive spring contact, and an electrical terminal on the printed circuit board. In other embodiments, a conductive wire may provide the electrical connection between the bezel and an electrical terminal on the printed circuit board. The housing may be shaped such that the electronic device has a circular face (e.g., a circular watch face) and the bezel may be annular in shape.

The side wall of the housing may be formed of an electrically nonconductive material, such as ceramic, plastic, or combinations thereof. The side wall may be a single, continuous side wall or a plurality of side walls that form an internal cavity when combined with a lower surface that contacts a wearer's wrist and an opposing upper surface. In embodiments, the side wall may include one or more openings for depressible buttons. The side wall provides structural support between the upper and lower surfaces of the housing. In embodiments, the side wall may be formed of two or more layers, each having a non-conductivity characteristic common to or varying in comparison to other layer(s). For example, the side wall may have a nonconductive upper layer that is formed by a different material than a nonconductive lower layer.

A nonconductive slot may be formed by a portion of a nonconductive side wall, an air gap, or a combination thereof, bound by an upper portion, a lower portion and side portions. In embodiments, the nonconductive slot may be formed by positioning the bezel, a perimeter of the printed circuit board, and electrical connections to the two of the electrical ground terminals to enclose an area that is not electrically conductive. For instance, the nonconductive slot may be formed by a portion of a nonconductive side wall located between the bezel, a perimeter of the printed circuit board, and the electrical connections to the two of the electrical ground terminals. In some embodiments, a width of the bezel may exceed a width of the side wall such that an air gap exists under a portion of the bezel extending over the side wall in the internal cavity between the bezel, a perimeter of the printed circuit board, and the electrical connections to the two of the electrical ground terminals. Thus, a first portion of a circumference of an electrically conductive bezel may form an upper portion of a first antenna utilizing a slot-antenna configuration.

Unlike an inverted-F antenna configuration, which typically has an upper arm (radiating leg) electrically connected to one ground (G) connection point (shorting pin) electrically grounding the upper arm and one signal feed (F) connection point from a ground plane used to transmit or receive an electronic signal, the slot-antenna configuration has two ground (G) connection points and one feed (F) connection point. The inverted-F antenna configuration has an open end opposite the location of the ground (G) connection point (the signal feed (F) connection is typically between the open end and the ground (G) connection point). The nonconductive slot formed by positioning a conductive bezel, a perimeter of the printed circuit board, and electrical connections to the two of the electrical ground terminals, as disclosed herein, encloses an area that is not electrically conductive by four sides and, thus, lacks an open end that is characteristic of conventional inverted-F antennas.

The length of the first portion of the circumference of the bezel associated with the first antenna may be one-half of a wavelength of the first electronic signal as a result of the slot-antenna configuration achieved by utilizing techniques disclosed herein. The length of an inverted-F antenna is typically a quarter of a wavelength of an electrical signal transmitted or received using the inverted-F antenna, so an inverted-F antenna configuration results in an antenna length that may be one-half the length of a slot-antenna configuration. The length of an inverted-F antenna is typically measured using the length of the upper arm from an open end to an opposite end of the upper arm, which is typically the location of the shorting pin connection.

The first antenna is at least partially formed by a first portion of the conductive bezel. In embodiments where two ground (G) connection points provide outer connections (top corners of the nonconductive slot) and the signal feed (F) connection is between two ground (G) connection points, the first portion of the conductive bezel between the electrical connections to the electrical ground (G) terminals may form the first portion of the circumference of the bezel associated with the first antenna. In embodiments where the signal feed (F) connection and a first ground (G) connection point provide outer connections (top corners of the nonconductive slot) and a second ground (G) connection point is between the signal feed (F) connection and the first ground (G) connection point, the first portion of the conductive bezel between the signal feed (F) connection and the first ground (G) connection point may form the first portion of the circumference of the bezel associated with the first antenna.

In embodiments, the first antenna may be further formed by the electrical connections to the electrical ground terminals and the electrical terminals (first electronic signal terminal and the first and second electrical ground terminals) on the printed circuit board. In some embodiments, the top portion of the nonconductive slot may be formed by the first portion of the conductive bezel on top, the lower portion of the nonconductive slot may be formed by the perimeter of the printed circuit board, which may provide a ground plane for the first antenna, and the sides of the nonconductive slot may be formed by the electrical connections to two electrical ground terminals on the printed circuit board. In other embodiments, the top portion of the nonconductive slot may be formed by the first portion of the conductive bezel on top, the lower portion of the nonconductive slot may be formed by the perimeter of the printed circuit board, which may provide a ground plane for the first antenna, and a first side of the nonconductive slot may be formed by the electrical connection to one electrical ground terminal on the printed circuit board and a second side of the nonconductive slot may be formed by the electrical connection to the first electronic signal terminal on the printed circuit board.

The first antenna may be configured to wirelessly receive a first electronic signal, such as a GPS signal, and communicate the received first electronic signal to components positioned in the internal cavity, such as the location determining component. The location determining component may process the received first electronic signal to determine a geolocation of the electronic device.

The electronic device may include a second antenna configured to utilize the slot-antenna configuration in some embodiments. The second antenna may be configured to transmit and receive a second wireless signal, such as Bluetooth™, Wi-Fi, cellular, etc., and may wirelessly transmit and receive a corresponding second electronic signal. The second antenna may be formed from a second electronic signal terminal, third and fourth electrical ground terminals, and a second portion of the circumference of the bezel. The length of the second portion of the circumference of the bezel associated with the second antenna may be based on a wavelength or frequency (wavelength=c (speed of light)/frequency) of the second electronic signal, which may have a different wavelength (or frequency) in comparison to the first electronic signal. For example, the length of the second portion of the circumference of the bezel associated with the second antenna may be one-half (or one-fourth) of a wavelength of the second electronic signal, which may have a frequency that is twice (double) the frequency of the first electronic signal.

In embodiments, the first antenna and the second antenna may share one or more electrical ground terminals on the printed circuit board. For example, one of the two electrical ground terminals associated with the first antenna may be electrically connected to the second antenna such that the electrical ground terminal is also associated with the second antenna.

Figure 10B:
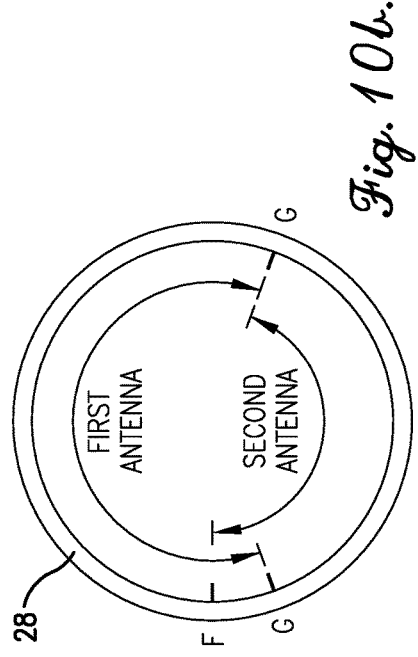
FIG. 10b is a schematic drawing illustrating how the first and second antennas each occupy a portion of the bezel in accordance with an embodiment of the current technology.
Figure 10D:
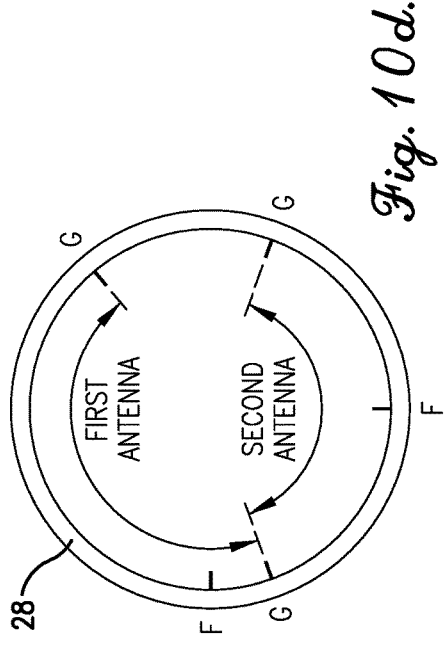
FIG. 10d is a schematic drawing illustrating how the first and second antennas each occupy a portion of the bezel in accordance with an embodiment of the current technology.
Figure 10A:
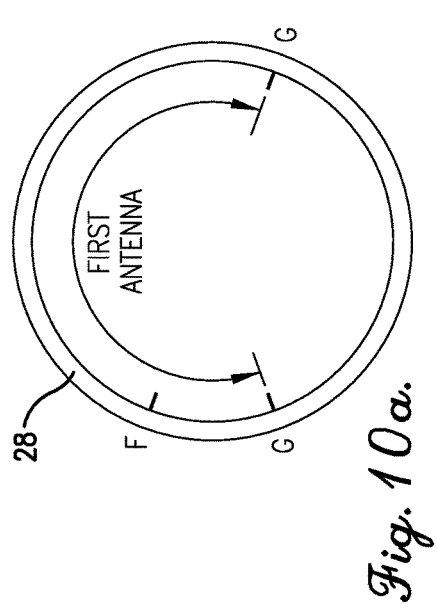
FIG. 10a is a schematic drawing illustrating how the first antenna occupies a portion of the bezel in accordance with an embodiment of the current technology.
Figure 10C:
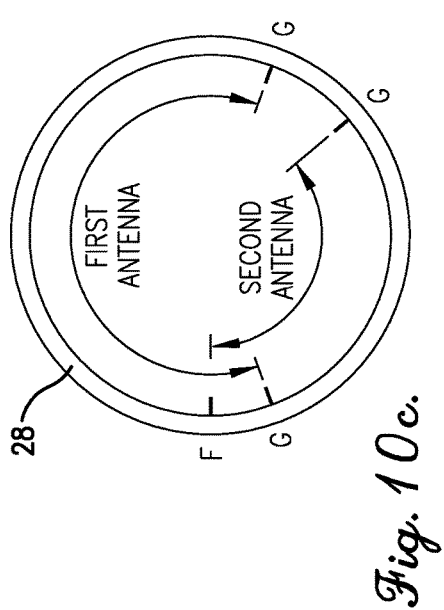
FIG. 10c is a schematic drawing illustrating how the first and second antennas each occupy a portion of the bezel in accordance with an embodiment of the current technology.

In embodiments, the first portion of the circumference of the bezel at least partially forming the first antenna may partially overlap with the second portion of the circumference of the bezel at least partially forming the second antenna. For example, as shown in FIGS. 10b and 10c, the first portion of the circumference of the bezel may overlap with the second portion of the circumference of the bezel in the portion between the feed (F) and one of the ground (G) connection points on the circumference of the bezel.

Embodiments of the technology will now be described in more detail with reference to the drawing figures. Referring initially to FIGS. 1-4, an exemplary wrist-worn electronic device 10 is illustrated. The electronic device 10 broadly comprises a housing 12, a display 14, a user interface 16, a location determining element 18, a communication element 20, a memory element 22, a processing element 24, a printed circuit board 26, a bezel 28, a first antenna 30 and a second antenna 32. The electronic device 10 may also include a wrist band 36, a strap, or other attachment mechanisms.

The housing 12 generally houses or retains other components of the electronic device 10 and may include or be coupled to the wrist band 36. The housing 12 may include a lower wall 38, an upper surface 40, at least one side wall 42, and an internal cavity 44. The lower wall 38 may include a lower, outer surface that contacts the user's wrist while the user is wearing the electronic device 10. The upper surface 40 opposes the lower wall 38 and may include an upper surface. Display 14 may form a portion of upper surface 40. In various embodiments, the upper surface 40 may further include an opening that extends from the upper surface to the internal cavity 44. Side wall 42 may be formed of an electrically nonconductive material, such as ceramic, plastic, or combinations thereof. Side wall 42 may be a single, continuous side wall or a plurality of side walls that form internal cavity 44 when combined with a lower wall 38 that contacts a wearer's wrist and an opposing upper surface 40. In some embodiments, such as the exemplary embodiments shown in the figures, the lower wall 38 of the housing 12 may have a round, circular, or oval shape, with a single circumferential side wall 42. In other embodiments, the lower wall 38 may have a four-sided shape, such as a square or rectangle, or other polygonal shape, with the housing 12 including four or more sidewalls 42.

Side wall 42 may include one or more openings for user interface 16 (e.g., depressible buttons, rotating knobs, etc.). Side wall 42 provides structural support between upper surface 40 and lower wall 38. In embodiments, one or more conductive elements be positioned adjacent to a portion of side wall 42.

In embodiments, side wall 42 may be formed of two or more layers, each having a non-conductivity characteristic common to or varying in comparison to other layer(s) of side wall 42. For example, side wall 42 may have a nonconductive upper layer that is formed by a different material than a nonconductive lower layer of side wall 42.

The internal cavity 44 may retain components such as, but not limited to, the location determining element 18, the communication element 20, the processing element 24, the memory element 22, and the printed circuit board 26. Internal cavity 44 may also retain a plurality of electrical terminals 48 on the printed circuit board 26, a plurality of tabs 50a-50c and a plurality of spring contacts 52a-52c.

The display 14 generally presents the information mentioned above, such as time of day, current location, and the like. The display 14 may be implemented in one of the following technologies: light-emitting diode (LED), organic LED (OLED), Light Emitting Polymer (LEP) or Polymer LED (PLED), liquid crystal display (LCD), thin film transistor (TFT) LCD, Memory-in-Pixel (MIP) LCD, LED side-lit or back-lit LCD, or the like, or combinations thereof. In some embodiments, the display 14 may have a round, circular, or oval shape. In other embodiments, the display 14 may possess a square or a rectangular aspect ratio which may be viewed in either a landscape or a portrait orientation.

Figure 2:
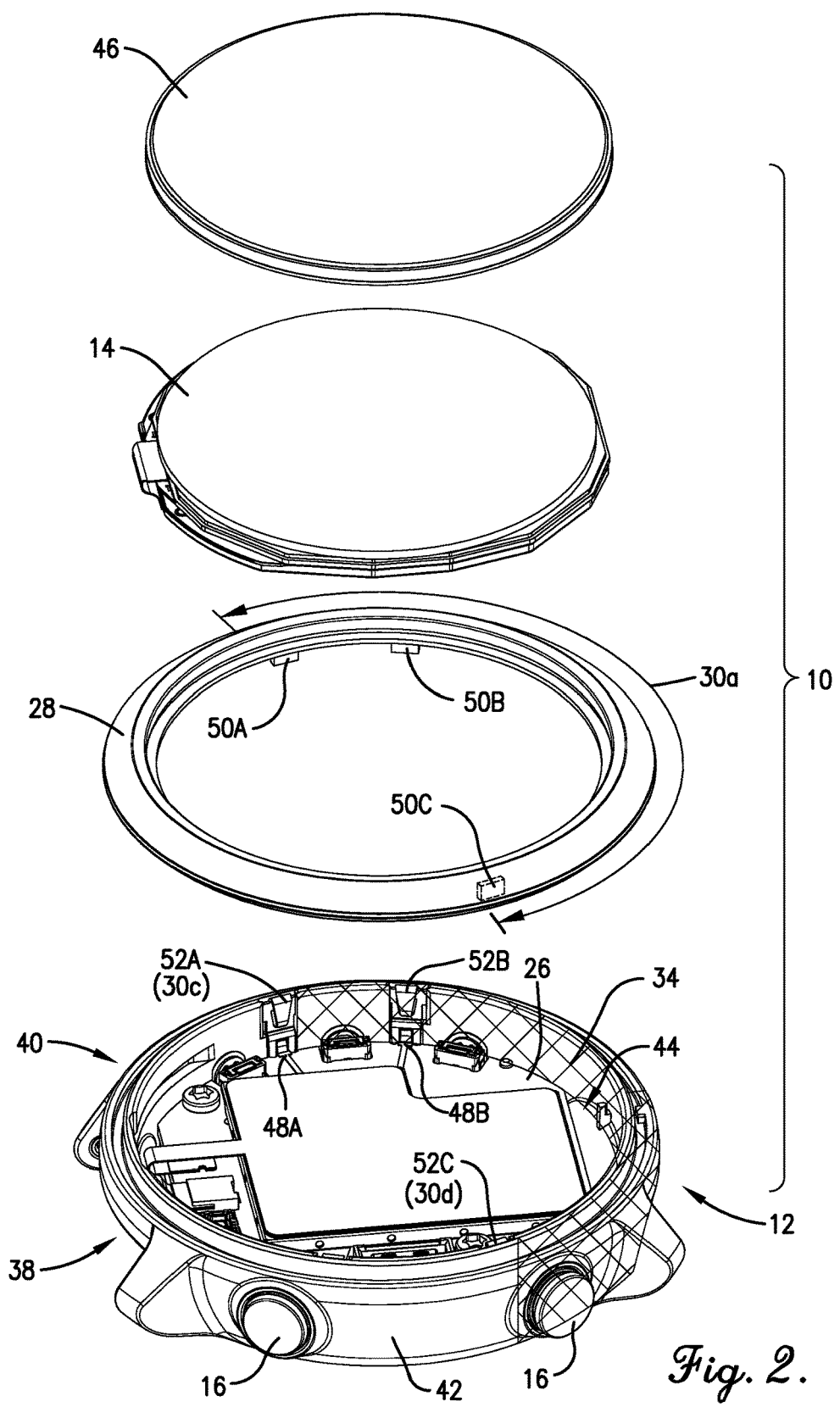
FIGS. 2 and 3 are exploded perspective views, from opposing sides, of the electronic device of FIG. 1, illustrating a lens, a display, and a bezel removed from a housing, the housing including additional components which, along with the bezel, form an antenna.
Figure 3:
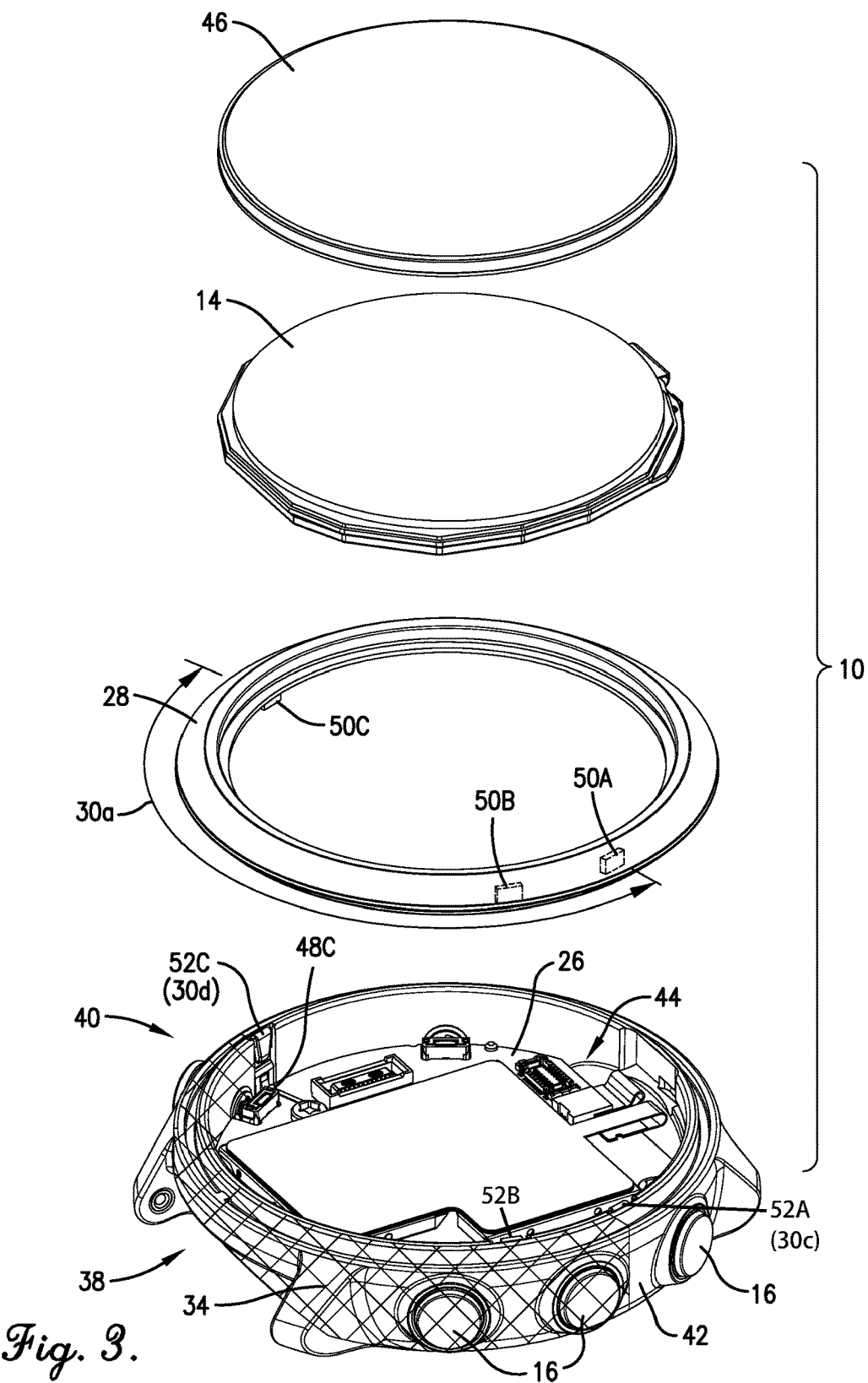

In exemplary embodiments seen in FIGS. 2 and 3, which are opposing views of electronic device 10, the display 14 may be at least partially positioned in the internal cavity 44 of the housing 12, such that the display 14 is adjacent to the opening of the upper surface 40 of the housing 12. The electronic device 10 may further include a lens 46 that is positioned on an upper surface of the display 14 to enhance the visibility of the information shown on the display 14.

The user interface 16 generally allows the user to directly interact with the electronic device 10 and may include pushbuttons, rotating knobs, or the like. In exemplary embodiments of FIGS. 2-4, the housing 12 may include one or more pushbuttons located on the sidewalls 42 thereof that function as at least a portion of the user interface 16. In various embodiments, the display 14 may also include a touch screen occupying the entire display 14 or a portion thereof so that display 14 functions as at least a portion of the user interface 16. The touch screen may allow a user to interact with the electronic device 10 by physically touching, swiping, or gesturing on areas of the display 14.

The location determining element 18 generally determines a current geolocation of the electronic device 10 and may process a first electronic signal, such as radio frequency (RF) electronic signals, from a global navigation satellite system (GNSS) such as the global positioning system (GPS) primarily used in the United States, the GLONASS system primarily used in the Soviet Union, or the Galileo system primarily used in Europe. The location determining element 18 may include satellite navigation receivers, processors, controllers, other computing devices, or combinations thereof, and memory. The location determining element 18 may be in electronic communication with the first antenna 30, although, in some embodiments, the location determining element 18 may be in electronic communication with the second antenna 32. The first antenna 30 (or the second antenna 32) may wirelessly receive a first electronic signal from one or more of the previously-mentioned satellite systems and provide the first electronic signal to location determining component 18. The location determining element 18 may process the first electronic signal, which includes data and information, from which geographic information such as the current geolocation is determined. The current geolocation may include geographic coordinates, such as the latitude and longitude, of the current geographic location of electronic device 10. The location determining element 18 may communicate the current geolocation to processing element 24.

Although embodiments of the location determining element 18 may include a satellite navigation receiver, it will be appreciated that other location-determining technology may be used. For example, cellular towers or any customized transmitting radio frequency towers can be used instead of satellites may be used to determine the location of the electronic device 10 by receiving data from at least three transmitting locations and then performing basic triangulation calculations to determine the relative position of the device with respect to the transmitting locations. With such a configuration, any standard geometric triangulation algorithm can be used to determine the location of the electronic device. The location determining element 18 may also include or be coupled with a pedometer, accelerometer, compass, or other dead-reckoning components which allow it to determine the location of the electronic device 10. The location determining element 18 may determine the current geographic location through a communications network, such as by using Assisted GPS (A-GPS), or from another electronic device. The location determining element 18 may even receive location data directly from a user. In these alternative embodiments, the location determining element 18 may also be in electronic communication with the first antenna 30.

The communication element 20 generally enables communication between electronic device 10 and external systems or devices, other than GPS systems. The communication element 20 may include signal or data transmitting and receiving circuits, such as amplifiers, filters, mixers, oscillators, digital signal processors (DSPs), and the like. Various combinations of these circuits may form a transceiver, which transmits, receives, and processes signals such as the ones listed in the following discussion. The communication element 20 may establish communication wirelessly by utilizing radio frequency (RF) signals and/or data that comply with communication standards such as cellular 2G, 3G, or 4G, Institute of Electrical and Electronics Engineers (IEEE) 802.11 standard such as Wi-Fi, IEEE 802.16 standard such as WiMAX, Bluetooth™, or combinations thereof. In addition, the communication element 20 may utilize communication standards such as ANT, ANT+, Bluetooth™ low energy (BLE), the industrial, scientific, and medical (ISM) band at 2.4 gigahertz (GHz), or the like. The communication element 20 may be in communication with the processing element 24 and the memory element 22. In various embodiments, the electronic device 10 may be configured to establish communication with more than one protocol or standard, and the communication element 20 may include a transceiver for each protocol or standard, such as Bluetooth™, Wi-Fi, cellular, etc., with which the device 10 can communicate. Thus, the communication element 20 may be in electronic communication with the second antenna 32. The antennas 32 may wirelessly transmit and receive electronic signals to and from exercise-related sensors, such as a heart rate monitor, a foot pod, a bike speed and cadence sensor, or the like, other electronic devices, such as a smartphone, a tablet, a laptop, or a desktop computer, or communication network interfaces such as a Wi-Fi router or a cell tower. The antennas 32 may also wirelessly transmit and receive electronic signals, derived from the electronic signals, to and from the communication element 20.

The memory element 22 may include data storage components such as read-only memory (ROM), programmable ROM, erasable programmable ROM, random-access memory (RAM), or the like, or combinations thereof. The memory element 22 may include, or may constitute, a "computer-readable medium". The memory element 22 may store the instructions, code, code segments, software, firmware, programs, applications, apps, services, daemons, or the like that are executed by the processing element 24. In some embodiments, the memory element 22 may be embedded in, or packaged in the same package as, the processing element 24. The memory element 22 may also store data such as map, track, or route data, settings, documents, sound files, photographs, movies, images, databases, or the like.

The processing element 24 may include electronic hardware components such as processors, microprocessors (single-core or multi-core), microcontrollers, DSPs, field-programmable gate arrays (FPGAs), analog and/or digital application-specific integrated circuits (ASICs), or the like, or combinations thereof. The processing element 24 may generally execute, process, or run instructions, code, code segments, software, firmware, programs, applications, apps, processes, services, daemons, or the like. The processing element 24 may also include hardware components such as finite-state machines, sequential and combinational logic, and other electronic circuits that can perform the functions necessary for the operation of the current invention. The processing element 24 may be in communication with the other electronic components through serial or parallel links that include universal busses, address busses, data busses, control lines, and the like.

The printed circuit board 26, as seen in FIGS. 2-3, 5-6 and 7, generally provides a substrate for supplying electric power to, and electronic communication between, the electronic components in internal cavity 44, such as the location determining element 18, the communication element 20, the memory element 22, and the processing element 24. The printed circuit board 26 may be of generally known construction with a first, or top, side and an opposing second, or bottom, side. The printed circuit board 26 may also include multiple electrically conductive layers with a top conductive layer placed on the first side, a bottom conductive layer placed on the second side, one or more inner conductive layers positioned between the first and second sides, and an insulating layer between each pair of adjacent conductive layers. The insulating layers may be formed from rigidized material that includes various combinations of fiberglass, woven glass, matte glass, cotton paper, phenolic cotton paper, polyester, epoxies, epoxy resins, and the like. Each conductive layer may include one or more conductive electronic signal or electrical power or ground traces, one or more signal, power, or ground pads, full or partial power planes, or full or partial ground planes. The conductive layers may be formed from metals typically including copper, but also including nickel, aluminum, gold, silver, palladium, zinc, tin, lead, and the like. In addition, the printed circuit board 26 may include plated through hole vias, blind vias, buried vias, and the like. The electronic components may be implemented in packages which are mounted on the top side, the bottom side, or both sides. The electronic components may communicate with one another through electronic signal traces.

Furthermore, the printed circuit board 26 may include a plurality of electrical terminals 48 formed from electrically conductive material deposited on printed circuit board 26, such as positions along a perimeter of printed circuit board 26. Each terminal 48 may include a strip of conductive material, with space between other terminals 48. In some embodiments, the terminals 48 may alternatively or additionally be positioned on one or more surfaces, such as the first side of printed circuit board 26. The terminals 48 may include a plurality of electronic signal terminals, each of which is electrically connected to one electronic signal trace, and a plurality of electric ground terminals, each of which is electrically connected to electrical ground. The printed circuit board 26 may provide a ground plane for the first antenna 30 and the second antenna 32.

Given that the printed circuit board 26 may be retained within internal cavity 44 of housing 12, the printed circuit board 26 may have an outline shape and perimeter that is generally similar to the shape of the interior of the housing 12. In exemplary embodiments, the housing 12 is generally circular, and thus, the outline shape of the printed circuit board 26 may be circular, hexagonal or octagonal to approximate the circular shape. Other outline shapes of the printed circuit board 26 are possible including square, rectangular, or even circular. In embodiments, printed circuit board 26 may have an irregular shaped such that it is partially circular and partially rectangular.

The bezel 28, as seen in FIGS. 2-3, 5-6 and 7, may be positioned on the upper surface 40 of housing 12 and may generally cover the perimeter edges of the display 14 or encircle display 14. The bezel 28 may be a ring shaped to conform to the shapes of a circular or oval housing 12 and display 14 such that bezel 28 may be positioned between the perimeters of housing 12 and display 14. The bezel 28 may have an outer perimeter, or outer circumference, that is substantially the same shape as the upper surface 40 of housing 12 and an inner perimeter, or inner circumference, that is substantially the same shape as the outer perimeter of display 14. For example, the bezel 28 may have an inner edge with dimensions that are smaller than or approximately equal to the perimeter dimensions of the display 14 and an outer edge with dimensions that are approximately equal to the perimeter dimensions of the upper surface of the housing 12. Thus, the bezel 28 may be circular, square, or rectangular with a central opening through which the display 14 may be viewed. In the exemplary embodiments shown in the figures, bezel 28 may have an annular shape. In various embodiments, the bezel 28 may be aligned with the lens 46 positioned atop the display 14.

The bezel 28 may be formed from any material that may integrate an electrically conductive material, such as a metallic or semi-metallic material, and may be positioned on or fixedly attached to one or more nonconductive side walls 42 of housing 12. In some embodiments, the bezel 28 may be able to rotate in place, roughly around the center of the upper surface of the housing 12. In other embodiments, the bezel 28 may be fixedly attached to the upper surface and may not rotate. In embodiments, the bezel 28 may be integral to housing 12. For example, conductive bezel 28 may be a raised or flush portion of housing 12 with a central opening through which display 14 may be viewed and positioned above one or more nonconductive side walls 42.

As detailed herein, first antenna 30 may be configured as a slot antenna, which generally includes a nonconductive slot 34 formed by a portion of a nonconductive side wall 42, an air gap, or a combination thereof. The nonconductive slot 34 may have any three-dimensional shape such as a substantially rectangle, a square, an oval, or a circle shape formed in a portion of housing 12. The first antenna 30, as seen in FIGS. 2-3, 5, 6a-6b, and 8, is a slot antenna having a nonconductive slot 34 in which the "slot" is formed or bound by an upper portion 30a, a lower portion 30b, and spring contacts 52A, 52C serving as side portions 30c, 30d, respectively, of first antenna 30.

First antenna 30 generally converts wireless RF electromagnetic radiation (an electronic signal) into a corresponding electronic signal. The nonconductive slot 34 through which the electric field of first antenna 30 passes includes a portion of nonconductive side wall 42. A signal transmitted using first antenna 30 having a nonconductive slot 34 within a side wall 42 of housing 12 is output (electromagnetically radiates) to the side of housing 12 in the far field (based on constructive and destructive interference). Similarly, first antenna 30 may receive a signal output from that direction in the far field or from any other direction. FIGS. 2 and 3 depict components of electronic device 10 from opposing sides to illustrate the respective positions of each component, illustrating a lens, a display, and a bezel 28 removed from a housing 12. As shown in these Figures, a portion of bezel 28 extending from tab 50A to tab 50C form an upper portion 30A of first antenna 30. Tabs 50A-50C may contact and electrically couple with (form an electrical connection) spring contacts 52A-52C that are electrically coupled with electrical terminals 48A-48C on the printed circuit board 26.

Figure 5:
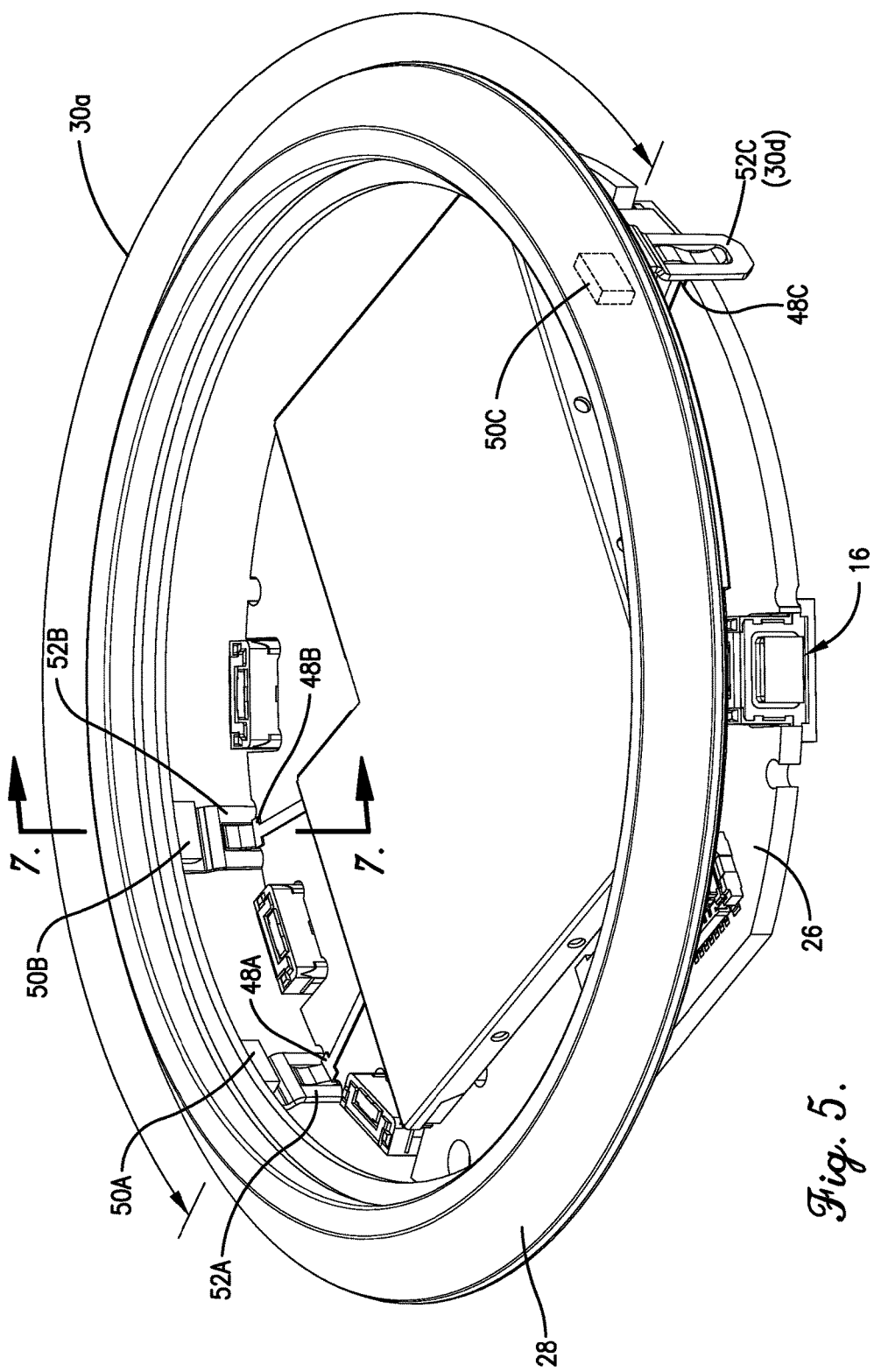
FIG. 5 is a top perspective view of a portion of the electronic device of FIG. 1 illustrating the bezel, a printed circuit board, and a plurality of spring contacts, portions of which form first and second antennas.
Figure 6A:
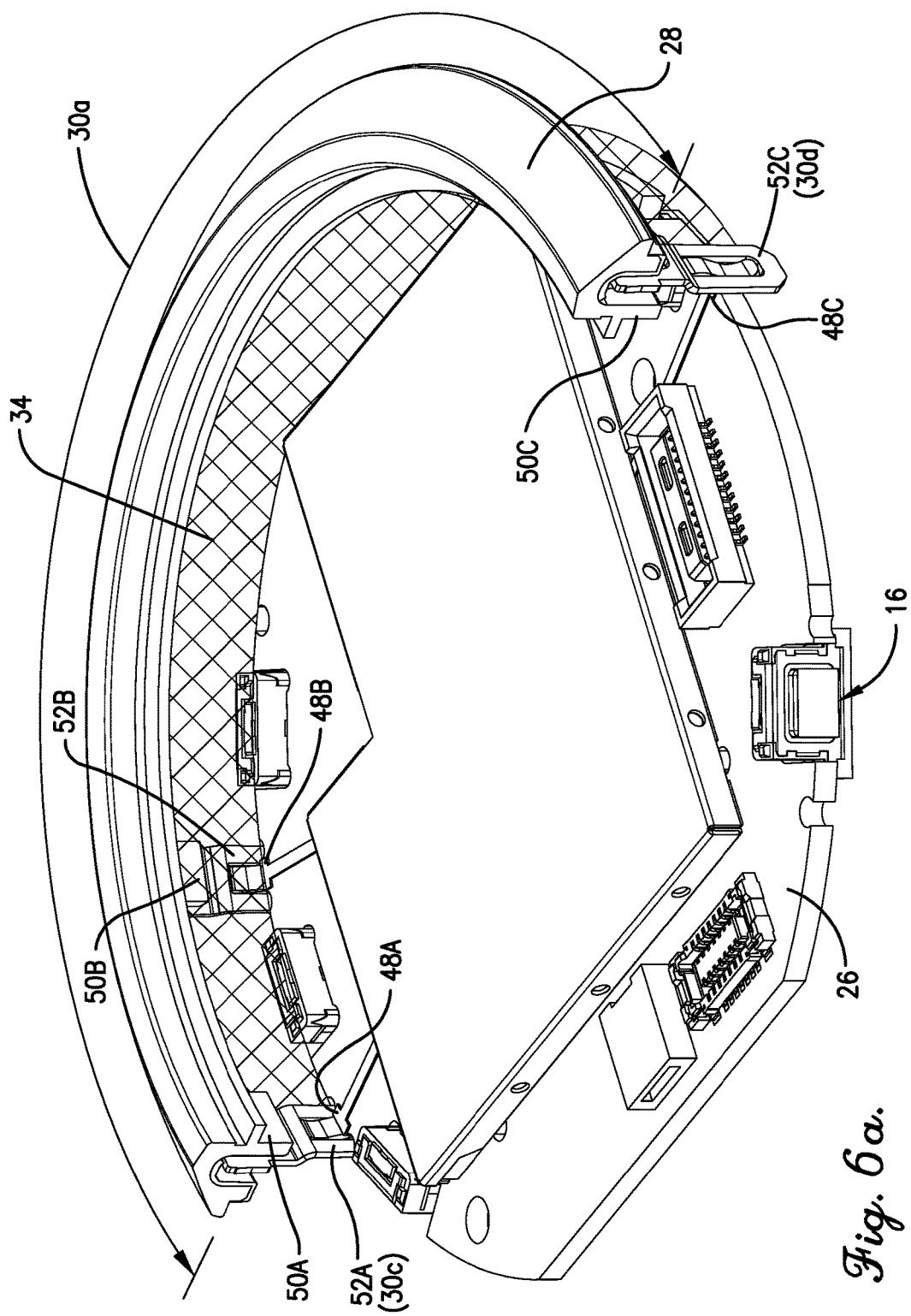
FIG. 6A is a top perspective view of a portion of the electronic device of FIG. 1 illustrating the printed circuit board and a plurality of spring contacts, portions of which form first and second antennas, without a portion of the bezel obstructing said components in FIG. 5.

FIGS. 5 and 6A, 6B depict components of electronic device 10 when bezel 28 is positioned against the upper surface 40 of housing 12 such that tabs 50A-50C contact and electrically couple with (form an electrical connection) spring contacts 52A-52C. In FIG. 6A, a portion of bezel 28 forming an upper portion 30a of first antenna 30 is presented and a remaining portion of bezel 28, which obstructs the view of printed circuit board 26 and certain other components in FIG. 5, is removed to expose printed circuit board 26 and certain components, such as tabs 50A, 50C, spring contacts 52A, 52C, and electrical terminals 48A, 48C. In FIG. 6B, first antenna 30 is presented without bezel 28 obstructing the view of printed circuit board 26 to expose printed circuit board 26, spring contacts 52A, 52C, and electrical terminals 48A, 48C.

In the depicted embodiment, spring contact 52A forms a side portion 30c of first antenna 30 and sprint contact 52C forms a side portion 30d of first antenna 30. First antenna 30 is formed by a nonconductive slot 34 within upper portion 30a, lower portion 30b, and side portions 30c, 30d. Specifically, the nonconductive slot 34 is formed between the bezel 28, a perimeter of the printed circuit board 26, and the electrical connections to two of the electrical ground terminals (spring contacts 52A and 52C). The nonconductive slot 34 may be formed within a side wall 42 of housing 12.

Figure 7:
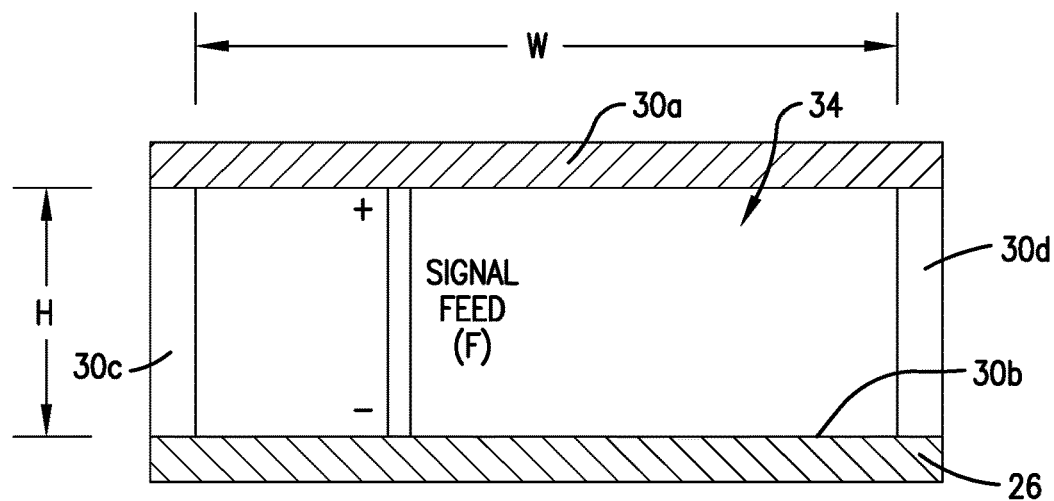
FIG. 7 is a side cross sectional view of an illustrative slot antenna in accordance with embodiments of the current technology.

A side cross-sectional view of the illustrative first antenna 30 having a nonconductive slot 34 having a width (W) and a height (H) is provided in FIG. 7. The nonconductive slot 34 is formed within upper portion 30a, lower portion 30b, and side portions 30c, 30d. As discussed above, upper portion 30a corresponds to a portion of bezel 28, lower portion 30b corresponds to a perimeter of printed circuit board 26, and side portions 30c, 30d correspond to spring contacts 52A, 52C, respectively. In the depicted example, spring contact 52B may electrically couple with a first portion of a circumference of the bezel 28 between first and third spring contacts 52A (G), 52C (G) and spring contact 52B may provide a signal feed (F) to first antenna 30.

FIG. 8 provides a cross-sectional view of a tab 50 (of bezel 28) contacting and electrically coupling with (forming an electrical connection) a spring contact 52 that is electrically coupled with an electrical terminal 48A on printed circuit board 26.

Figure 9:
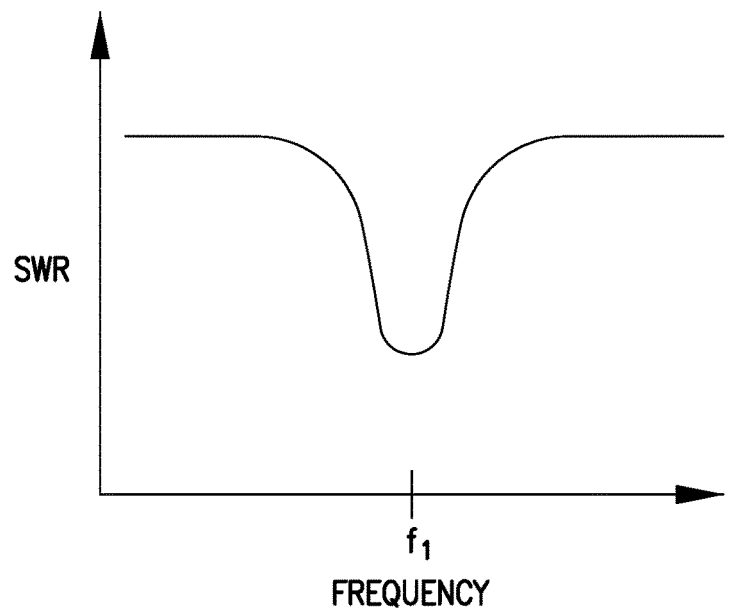
FIG. 9 is an illustrative antenna performance graph for an antenna in accordance with embodiments of the current technology in which standing-wave-ratio (SWR) values are plotted as a function of operating frequency.

FIG. 9 is a graph illustrating antenna performance for first antenna 30 when it is fed a signal in accordance with embodiments of the current technology. The graph provides a plot of standing-wave-ratio (SWR) values as a function of operating frequency. As shown in FIG. 9, first antenna 30 operates in a frequency band approximately centered about a frequency f1, which is determined by a combination of the width (W) and height (H) of nonconductive slot 34. For example, in an embodiment, a width (W) and height (H) of nonconductive slot 34 may be chosen such that the frequency f1 may be equal to one-half wavelength of an electronic signal desired to be transmitted and/or received by first antenna 30. First antenna may thus be tuned to transmit and/or receive desired electronic signals by varying the dimensions of nonconductive slot 34.

Figure 4:
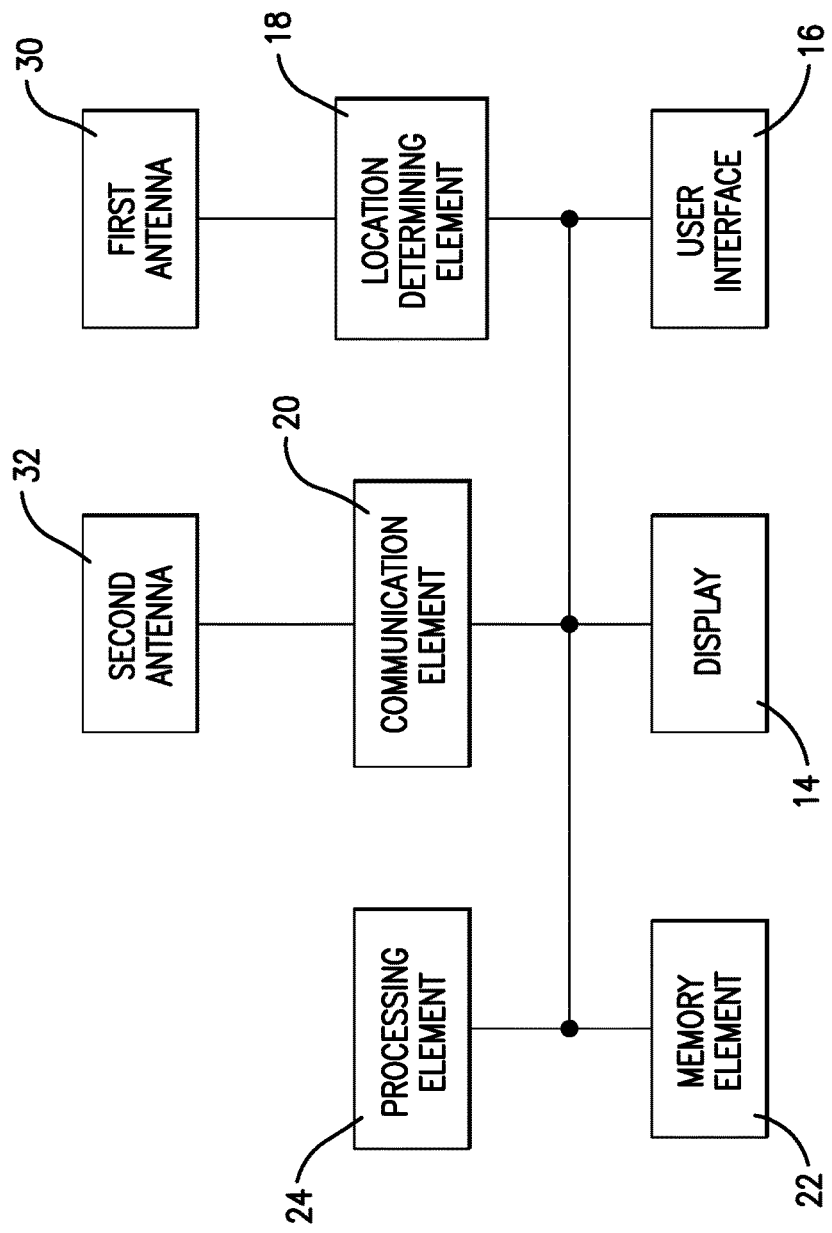
FIG. 4 is a schematic block diagram illustrating electronically coupled functional components of the electronic device of FIG. 1.

In the exemplary embodiment shown in FIG. 4, the first antenna 30 is in electronic communication with the location determining element 18, such that it is configured to wirelessly receive a GPS signal from GPS satellites. In other embodiments, the first antenna 30 may be configured to wirelessly transmit and receive electronic signals from any of the sources discussed above and shown in FIG. 1, such as cell towers, Wi-Fi routers, other electronic devices, etc.

In embodiments, the nonconductive slot 34 may be formed by a portion of nonconductive side wall 42. For example, a nonconductive slot 34 may be formed by a portion of a nonconductive side wall 42 defined or enclosed by a portion of the conductive bezel 28 between a first spring contact 52A and a third spring contact 52C (each providing an electrical connection to an electrical ground terminal 48), a perimeter of the printed circuit board 26 between the first and third spring contacts 52A, 52C, and the first and third spring contacts 52A, 52C. A second spring contact 52B may provide an electrical connection to an electrical signal feed (F).

In other embodiments, the nonconductive slot 34 may be formed by a combination of an air gap and a portion of nonconductive side wall 42. For example, a width of bezel 28 may exceed a width of nonconductive side wall 42 such that an air gap exists under a portion of bezel 28 extending over side wall 42 in the internal cavity 44. Similar to the embodiment described above, the air gap may be defined or enclosed by a portion of the conductive bezel 28 between a first spring contact 52A and a third spring contact 52C (each providing an electrical connection to an electrical ground terminal 48), a perimeter of the printed circuit board 26 between the first and third spring contacts 52A, 52C, and the first and third spring contacts 52A, 52C. A second spring contact 52B may provide an electrical connection to an electrical signal feed (F). Thus, the air gap may be located adjacent to the same portion of a nonconductive side wall 42 defined or enclosed by a portion of conductive bezel 28 between the first and third spring contacts 52A, 52C, a perimeter of the printed circuit board 26 between the first and third spring contacts 52A, 52C, and the first and third spring contacts 52A, 52C. As a result, the nonconductive slot 34 through which the electric field of first antenna 30 passes includes a portion of nonconductive side wall 42 and an air gap.

In some embodiments, first antenna 30 may be formed by a combination of electronic signal terminal 48B (providing an electrical signal feed (F) connection) and ground terminals 48A, 48C (providing an electrical ground (G) connection) on printed circuit board 26, a first portion of a circumference of the bezel 28 between first and third spring contacts 52A (G), 52C (G) (corresponding to the locations of tabs 50A and 50C, respectively, when the bezel is positioned against the upper surface 40 of housing 12), including the portion of bezel 28 at which second spring contact 52B (F) is connected, and a first portion of a circumference of printed circuit board 26 between the first and third spring contacts 52A (G), 52C (G). In this configuration, the edges of the nonconductive slot 34 are the electrical ground (G) connection points to bezel 28 and printed circuit board 26.

As shown in FIGS. 2 and 3, first antenna 30 (a slot antenna) is formed by an upper portion 30a, a lower portion 30b, and side portions 30c, 30d. Upper portion 30a, lower portion 30b, and side portions 30c, 30d are all in electrical and physical contact such that a nonconductive slot 34 is formed inside these portions of first antenna 30. Upper portion 30a of first antenna 30 is formed by a first portion of a circumference of bezel 28 extending between first and third spring contacts 52A (G), 52C (G) (corresponding to the locations of tabs 50A and 50C, respectively) when the bezel is positioned against the upper surface 40 of housing 12. Lower portion 30b of first antenna 30 is formed by a first portion of the circumference of the printed circuit board 26 extending between first and third spring contacts 52A (G), 52C (G) such that lower portion 30b corresponds to upper portion 30a. Side portions 30c, 30d of first antenna 30 are formed by spring contacts 52A, 52C, respectively. Thus, first antenna 30 operates as a slot antenna because a nonconductive slot 34 is formed by the upper portion 30a (a first portion of the circumference of bezel 28), a lower portion 30b (a first portion of the circumference of printed circuit board 26) and two side portions 30c, 30d (spring contacts 52A and 52C).

In other embodiments, the first portion of a circumference of the bezel 28 forming an upper portion 30a of first antenna 30 may extend between second spring contact 52B (F) and third spring contact 52C (G) (corresponding to the locations of tabs 50B and 50C, respectively, when the bezel is positioned against the upper surface 40 of housing 12), including the portion of bezel 28 at which first spring contact 52A (G) is connected. In this configuration, the edges of the nonconductive slot 34 are one electrical ground (G) connection point and one electrical signal feed (F) connection point to bezel 28 and printed circuit board 26.

The electrically conductive plane of first antenna 30, which is a slot antenna, may be provided by the ground plane of the printed circuit board 26 and the first portion of the bezel 28 forming an upper portion 30a of first antenna 30. The nonconductive slot 34 may be provided by the nonconductive side wall 42 of housing 12 between portions of the printed circuit board 26 and the bezel 28 between spring contacts 52. One of the electronic terminals, such as electronic signal terminal 48B, may provide the signal feed and two of the electronic terminals, such as ground terminals 48A, 48C, may provide the electrical ground for the first antenna 30.

A length (circumferential distance) of the first portion of the circumference of bezel 28 utilized for the upper portion 30a of first antenna 30 may be based on a wavelength—typically, a one-half wavelength—of the wireless signal to be transmitted or received by first antenna 30. Generally, the one-half wavelength of an electronic signal, e.g., a GPS signal, determines a length along the circumference of the bezel 28 forming an upper portion 30a of first antenna 30 that must be utilized to transmit or receive the electronic signal using the first antenna 30. It is to be understood that the length of upper portion 30a of first antenna 30 that must be utilized to receive an electronic signal may account for a larger portion of a bezel 28 having a smaller circumference than a bezel 28 having a larger circumference.

Electrical connections to bezel 28 for a first and a second electrical ground (G) may be provided at first and second endpoints, respectively, of the first portion of the circumference of bezel 28 occupied by the first antenna 30. An electrical connection to bezel 28 for a signal feed (F) may be provided at a point along the first portion of the circumference of the bezel 28 occupied by the upper portion 30a of first antenna 30 between the first and second endpoints associated with the electrical ground (G). Typically, the signal feed (F) is electrically connected to bezel 28 at a point away from a midpoint of the first portion of the circumference of the bezel 28 occupied by the first antenna 30 (i.e., the signal feed (F) connection point is closer to one of the two electrical ground (G) connection points).

As shown in FIGS. 2-3 and 5-6, bezel 28 may include a plurality of tabs 50 that electrically couple with (form an electrical connection) a plurality of spring contacts 52 that are electrically coupled with electrical terminals 48 on the printed circuit board 26. As seen in FIGS. 2-3 and 5-7, each tab 50 of bezel 28 may be formed from electrically conductive material, such as metal, and may have a generally rectangular shape to contact a spring contact 52. Each tab 50 may be attached to, or integrally or monolithically formed with, the inner circumference of the bezel 28, such that each tab 50 extends normal to the plane of the bezel 28. Thus, when bezel 28 is placed above nonconductive side wall 42 during assembly of electronic device 10, each tab 50 extends downward into the internal cavity 44 of housing 12.

Each spring contact 52, as seen in FIGS. 2-3 and 5-7, may be formed from electrically conductive material, such as metal, and may have a generally elongated, flat shape. In addition, each spring contact 52 may include a first leaf spring 54 and a second leaf spring 56. The first leaf spring 54 may be positioned on a first half of the spring contact 52 and may be configured to make electrical contact with one electrically conductive tab 50 of bezel 28. The second leaf spring 56 may be positioned on a second half of the spring contact 52 and may be configured to make electrical contact with one electrical terminal 48 on the printed circuit board 26. Each spring contact 52 may be retained on an inner surface of nonconductive side wall 42.

The electrical connection for the first antenna 30 from bezel 28 to the printed circuit board 26 may include one tab 50 of bezel 28 contacting the first leaf spring 54 of one spring contact 52, and the second leaf spring 56 of the spring contact 52 electrically contacting one terminal 48 on the printed circuit board 26. Other embodiments of the electronic device 10 may include other electrical connection structures between the conductive bezel 28 and terminals 48 on the printed circuit board 26, such as pogo pins, electrically conductive wires, electrically conductive cables, flexible printed circuits, and so forth.

The second antenna 32 (also a slot antenna) may be substantially similar to the first antenna 30 in function and structure such that it may utilize a slot antenna configuration having a nonconductive slot. Second antenna 32 may utilize a portion of housing 12 not being utilized by or partially overlapping with first antenna 30. Similar to first antenna 30, the second antenna 30 may be configured as a slot antenna including a nonconductive slot formed by a portion of a nonconductive side wall, an air gap, or a combination thereof. The nonconductive slot may have any three-dimensional shape such as a substantially rectangle, a square, an oval, or a circle shape formed in a portion of housing 12. The second antenna 32 is a slot antenna having a nonconductive slot in which the "slot" is formed or bound by an upper portion, a lower portion, and two spring contacts serving as side portions of second antenna 32. The upper portion of second antenna 32, the lower portion of second antenna 32, and the side portions of second antenna 32 are all in electrical and physical contact such that a nonconductive slot is formed inside these portions of second antenna 32.

The upper portion of second antenna 32 is formed by a second portion of a circumference of bezel 28 extending in an area of bezel 28 that is not being utilized as upper portion 30a of first antenna 30. For instance, if the upper portion 30a of first antenna 30 extends from first spring contact 52A (G), through second spring contact 52B (F), to third spring contact 52C (G), the second portion of a circumference of bezel 28 associated with the second antenna 32 may extend between first and third spring contacts 52A (G), 52C (G) such that it does not include second contact 52B (F) (i.e., the opposite portion of bezel 28).

The lower portion of second antenna 32 is formed by a second portion of a circumference of the printed circuit board 26 extending between the spring contacts associated with the upper portion of second antenna 32 such that the lower portion of second antenna 32 corresponds to upper portion of second antenna 32. Side portions of second antenna 32 are formed by spring contacts associated the upper and lower portions of second antenna 32. The nonconductive slot for the second antenna 32 may be provided by the nonconductive side wall 42 of housing 12 between portions of the printed circuit board 26 and the bezel 28 between two spring contacts associated the upper and lower portions of second antenna 32.

In the exemplary embodiment shown in FIG. 4, the second antenna 32 is in electronic communication with the communication element 20, such that the second antenna 32 may wirelessly transmit and receive electronic signals to and from any of the signal sources shown in FIG. 1, except for GPS satellites (assuming that the first antenna 30 is configured to receive GPS signals). The second antenna 32 may be formed from electronic signal terminals 48 and electrical ground terminals 48 on the printed circuit board 26 and an upper portion of second antenna 32 may be formed by a second portion of the circumference of bezel 28. As with the first antenna 30, the length of the second portion of the bezel 28 circumference may be based on a half wavelength of the signal that the second antenna 32 is configured to transmit and receive. The second electronic signal may transmit and/or receive Bluetooth™, Wi-Fi, or cellular signals, among others, and the half wavelength of the second electronic signal may different than the half wavelength of the first electronic signal, which is transmitted or received by first antenna 30.

Figure 10F:
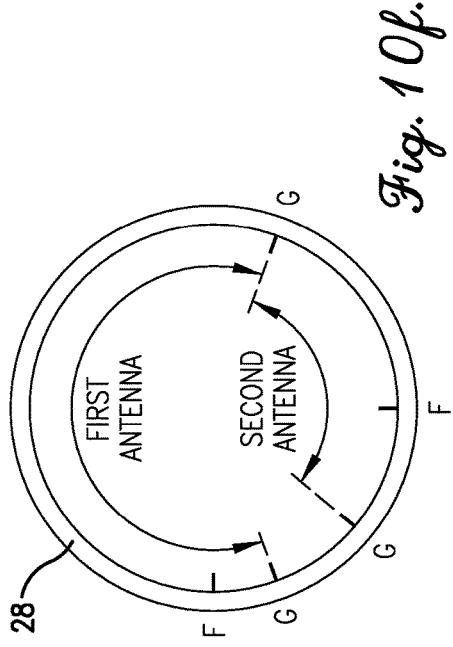
FIG. 10f is a schematic drawing illustrating how the first and second antennas each occupy a portion of the bezel in accordance with an embodiment of the current technology.
Figure 10E:
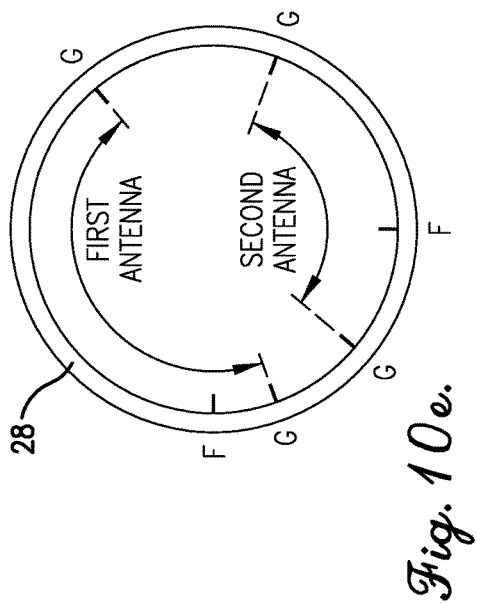
FIG. 10e is a schematic drawing illustrating how the first and second antennas each occupy a portion of the bezel in accordance with an embodiment of the current technology.

In some embodiments, second antenna 32 may share at least a portion of the same signal feed (F) and electrical ground (G) connection points on bezel 28 as first antenna 30. Thus, some of the second portion of the circumference (occupied by the second antenna 32) may overlap some of the first portion of the circumference (occupied by the first antenna 30). In other embodiments, second antenna 32 may have entirely different signal feed (F) and electrical ground (G) connection points on bezel 28 than the signal feed (F) and electrical ground (G) connection points utilized for first antenna 30. Hence, the second portion of bezel 28 circumference may be separate from the first portion of bezel 28 circumference such that the first and second portions do not overlap, as shown in FIG. 10e. Furthermore, the electrical connections for the second antenna 32 from the bezel 28 to the printed circuit board 26 may be formed in substantially the same manner as utilized for electrical connections for the first antenna 30.

Various embodiments of the current technology depicting different configurations of the first and second antennas 30, 32 sharing the bezel 28 are shown in FIGS. 10a-10g, one embodiment or configuration per figure. FIGS. 10a-10g depict only the upper portions of first and second antennas 30, 32. It is to be understood that lower portions of first and second antennas 30, 32 along a perimeter of printed circuit board 26 correspond to the positions of the upper portions of first and second antennas 30, 32 depicted in FIGS. 10a-10g. The bezel 28 is shown as an annulus with the signal feed (F) and electrical ground (G) connection points on the circumference of the bezel 28 for the first and second antennas 30, 32, which are marked and labeled. In addition, the arcuate portion labeled "first antenna" indicates the first portion of the circumference of the bezel 28 occupied by an upper portion of the first antenna 30, and the arcuate portion labeled "second antenna" indicates the second portion of the circumference of the bezel 28 occupied by an upper portion of the second antenna 32. The embodiment shown in FIG. 10a includes only the first antenna 30 utilizing a slot antenna configuration and thus the only connection points for the first antenna 30 are the signal feed (F) and two ground (G) connection points.

Unlike antennas that utilize an inverted-F configuration with one signal feed (F) and one ground (G) connection points, the first antenna 30 utilizing a slot antenna configuration has one signal feed (F) and two ground (G) connection points. In the embodiment shown in FIG. 10a, a first portion of a circumference of bezel 28, extending between two ground (G) connection points, at least partially forms first antenna 30. In the embodiments shown in FIGS. 10b-10g, the first antenna 30 and the second antenna 32 are included, and, as mentioned above, the first and second portions of the bezel circumference may overlap, may abut, or may be separate from one another.

In some embodiments, first antenna 30 and second antenna 32 may partially overlap. As shown in FIG. 10b, a first portion of a circumference of bezel 28, extending between two ground (G) connection points, at least partially forms first antenna 30 and a second portion of a circumference of bezel 28, extending between one of the two ground (G) connection points associated with first antenna 30 and a signal feed (F) connection point associated with first antenna 30, at least partially forms second antenna 32. As shown in FIG. 10c, a first portion of a circumference of bezel 28, extending between two ground (G) connection points, at least partially forms first antenna 30 and a second portion of a circumference of bezel 28, extending between a third ground (G) connection point and a signal feed (F) connection point associated with first antenna 30, at least partially forms second antenna 32. A portion of a circumference of bezel 28 is associated with first antenna 30 and second antenna 32 (the antenna partially overlap) in FIGS. 10b-10c.

In some embodiments, first antenna 30 and second antenna 32 may abut one another and share an electrical connection point. For example, as shown in FIGS. 10d and 10f, a first portion of a circumference of bezel 28, extending between two ground (G) connection points, at least partially forms first antenna 30 and a second portion of a circumference of bezel 28, extending between one of the two ground (G) connection points associated with first antenna 30 and a third ground (G) connection point, at least partially forms second antenna 32. As shown in FIG. 10d, the signal feed (F) connection point associated with first antenna 30 is closer to one of the two electrical grounding points associated with the first antenna 30, whereas the signal feed (F) connection point of the second antenna 32 is located an equal distance from two electrical grounding points associated with second antenna 32. However, it is to be understood that the signal feed (F) connection point of the second antenna 32 may be positioned closed to one of the electrical grounding points associated with the second antenna 32 such that it is configured to transmit and/or receive signals at one-half of a frequency of a second electrical signal.

In some embodiments, first antenna 30 and second antenna 32 may be separate from one another. For example, as shown in FIG. 10e, a first portion of a circumference of bezel 28, extending between a first pair of ground (G) connection points, at least partially forms first antenna 30 and a second portion of a circumference of bezel 28, extending between a second pair of ground (G) connection points, at least partially forms second antenna 32.

Figure 10G:
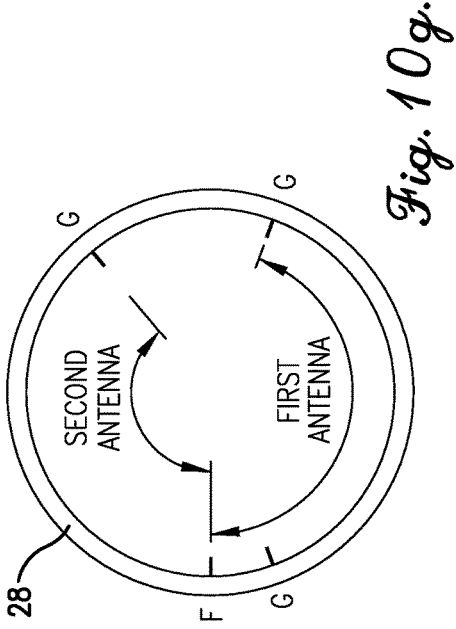
FIG. 10g is a schematic drawing illustrating how the first and second antennas each occupy a portion of the bezel in accordance with an embodiment of the current technology.

In some embodiments, one of first antenna 30 or second antenna 32 may wholly overlap with the other antenna. For example, as shown in FIG. 10g, a first portion of a circumference of bezel 28, extending between a signal feed (F) connection point and a first ground (G) connection point, at least partially forms first antenna 30 and a second portion of a circumference of bezel 28, extending between the signal feed (F) connection point associated with first antenna 30 and a third ground (G) connection point, at least partially forms second antenna 32.

The first and second antennas 30, 32 have been presented as each receiving a particular type of signal and being embodied by a particular type of antenna. In fact, in keeping with the spirit of the current technology, either antenna 30, 32 may be configured to receive any type of signal and/or be embodied by any type of antenna. For example, the first antenna 30 may be configured to receive a Bluetooth™ signal. The second antenna 32 may be configured to receive a GPS signal, and so forth.

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

1. A wrist-worn electronic device comprising:
   a housing including a lower surface, an opposing upper surface, a side wall formed of electrically nonconductive material, and an internal cavity;
   a printed circuit board positioned in the internal cavity and including a plurality of electrical ground terminals and a first electronic signal terminal;
   a location determining element positioned on the printed circuit board and configured to receive a first electronic signal and determine a current geolocation of the electronic device using the first electronic signal;
   a bezel formed of electrically conductive material and positioned above the nonconductive side wall, having electrical connections to two of the electrical ground terminals and having an electrical connection to the first electronic signal terminal, such that a nonconductive slot is formed between a first portion of a circumference of the bezel between the electrical connections to the two electrical ground terminals, a perimeter of the printed circuit board corresponding to the first portion of a circumference of the bezel, and the electrical connections to the two electrical ground terminals; and a first antenna formed at least partially by the first portion of a circumference of the bezel, the first antenna configured to wirelessly receive the first electronic signal and communicate the first electronic signal to the location determining element;

wherein the nonconductive slot corresponds to a portion of the nonconductive side wall.

2. The wrist-worn electronic device of claim 1, wherein the length of the first portion of the circumference of the bezel associated with the first antenna is one-half of a wavelength of the first electronic signal.

3. The wrist-worn electronic device of claim 1, further comprising:

a second antenna formed by a second portion of the circumference of the bezel between two of the electrical ground terminals associated with the second antenna, and a communication element positioned on the printed circuit board and configured to transmit to or receive from the second antenna a second electronic signal to communicate with another electronic device or a communication network;

wherein the printed circuit board includes a second electronic signal terminal electrically connecting the second antenna and the communication element.

4. The wrist-worn electronic device of claim 3, wherein the length of the second portion of the circumference of the bezel associated with the second antenna is one-half of a wavelength of the second electronic signal.

5. The wrist-worn electronic device of claim 3, wherein one of the two electrical ground terminals associated with the first antenna is electrically connected to the second antenna such that the electrical ground terminal is also associated with the second antenna.

6. The wrist-worn electronic device of claim 1, further comprising two electrically conductive tabs extending from an inner circumference of the bezel and two electrically conductive spring contacts positioned in the internal cavity, wherein the electrical connections between the bezel and the two electrical ground terminals associated with the first antenna is formed by the two electrically conductive spring contacts each being electrically connected to one tab and one of the plurality of electrical ground terminals.

7. The wrist-worn electronic device of claim 1, wherein the first antenna is further formed by the nonconductive slot.

8. The wrist-worn electronic device of claim 1, wherein the first electronic signal terminal is located at a position along the printed circuit board corresponding to the first portion of a circumference of the bezel between the two electrical ground terminals associated with the first antenna.

9. The wrist-worn electronic device of claim 1, wherein the nonconductive slot associated with the first antenna is further formed by a portion of the nonconductive side wall, and wherein the printed circuit board is a ground plane for the first antenna.

10. The wrist-worn electronic device of claim 3, wherein the first antenna formed by the first portion of a circumference of the bezel partially overlaps with the second antenna formed by the second portion of the circumference of the bezel.

11. A wrist-worn electronic device comprising:

a housing including a lower surface configured to contact a wearer's wrist, a side wall formed of electrically nonconductive material, an opposing upper surface, and an internal cavity;

a printed circuit board positioned in the internal cavity and including a plurality of electrical ground terminals and a first electronic signal terminal;

a location determining element positioned on the printed circuit board and configured to receive a first electronic signal and determine a current geolocation of the electronic device using the first electronic signal;

a bezel formed of electrically conductive material and positioned above the nonconductive sidewall, having electrical connections to two of the electrical ground terminals and having an electrical connection to the first electronic signal terminals, such that a nonconductive slot is formed by a first portion of the nonconductive sidewall-between the electrically conductive bezel between the electrical connections to the two electrical ground terminals, a perimeter of the printed circuit board corresponding to the first portion of a circumference of the bezel, and the electrical connections to the two electrical ground terminals; and a first antenna formed at least partially by the first portion of a circumference of the bezel, the first antenna configured to wirelessly receive the first electronic signal and communicate the first electronic signal to the location determining element, the length of the first portion of the circumference of the bezel associated with the first antenna being one-half of a wavelength of the first electronic signal;

wherein the printed circuit board is a ground plane for the first antenna;

wherein the nonconductive slot corresponds to a portion of the nonconductive side wall.

12. The wrist-worn electronic device of claim 11, further comprising two electrically conductive tabs extending from an inner circumference of the bezel and two electrically conductive spring contacts positioned in the internal cavity, wherein the electrical connections between the bezel and the two electrical ground terminals associated with the first antenna is formed by the two electrically conductive spring contacts each being electrically connected to one tab and one of the plurality of electrical ground terminals.

13. The wrist-worn electronic device of claim 11, wherein the sidewall has a width, and wherein the bezel is annular and has a width greater than the width of the sidewall.

14. The wrist-worn electronic device of claim 11, wherein the housing is circular, wherein the bezel is annular, and wherein the first antenna is further formed by the nonconductive slot.

15. The wrist-worn electronic device of claim 11, wherein the first electronic signal terminal is located at a position along the printed circuit board corresponding to the first portion of a circumference of the bezel between the two electrical ground terminals associated with the first antenna.

16. The wrist-worn electronic device of claim 15, wherein the position of the first electronic signal terminal along the first portion of a circumference of the bezel is closer to one of the two electrical ground terminals associated with the first antenna.

17. The wrist-worn electronic device of claim 12, further comprising:

a second antenna formed by a second portion of the circumference of the bezel between two of the electrical ground terminals, two of the electrical ground terminals, and the second electronic signal terminal, and a communication element positioned on the printed circuit board and configured to receive and process a second electronic signal to provide communication with another electronic device or a communication network, wherein the second antenna is configured to wirelessly receive a second electronic signal and communicate the second electronic signal to the communication element.

18. The wrist-worn electronic device of claim 17, wherein one of the two electrical ground terminals associated with the first antenna is electrically connected to the second antenna such that the electrical ground terminal is also associated with the second antenna.

19. The wrist-worn electronic device of claim 17, wherein the first antenna formed by the first portion of a circumference of the bezel partially overlaps with the second antenna formed by the second portion of the circumference of the bezel.

20. A wrist-worn electronic device comprising:
a housing including a lower surface configured to contact a wearer's wrist, a side wall formed of electrically nonconductive material, an opposing upper surface, and an internal cavity;
a printed circuit board positioned in the internal cavity and including a plurality of electrical ground terminals and an electronic signal terminal;
a location determining element positioned on the printed circuit board and configured to receive a first electronic signal and determine a current geolocation of the electronic device using the first electronic signal;
a bezel formed of electrically conductive material and positioned above the nonconductive sidewall, having electrical connections to two of the electrical ground terminals and having an electrical connection to the electronic signal terminals, such that a nonconductive slot is formed by a first portion of the nonconductive sidewall between a first portion of a circumference of the electrically conductive bezel between the electrical connections to the two electrical ground terminals, a perimeter of the printed circuit board corresponding to the first portion of the a circumference of the bezel, and the electrical connections to the two of the electrical ground terminals; and
a first antenna formed at least partially by the first portion of a circumference of the bezel, the first antenna configured to wirelessly receive the first electronic signal and communicate the first electronic signal to the location determining element, the length of the first portion of the circumference of the bezel associated with the first antenna being one-half of a wavelength of the first electronic signal;
wherein the nonconductive slot corresponds to a portion of the nonconductive side wall;
wherein the printed circuit board is a ground plane for the first antenna; and
wherein the electrical connection between the bezel and the electronic signal terminal is located at a position along the first portion of a circumference of the bezel between the electrical connections between the bezel and the two electrical ground terminals associated with the first antenna.

21. The wrist-worn electronic device of claim 6, further comprising a third electrically conductive tab extending from an inner circumference of the bezel and a third electrically conductive spring contact positioned in the internal cavity, wherein the electrical connection between the bezel and first electronic signal terminal is formed by the third electrically conductive spring contact being electrically connected to the third tab and the first electronic signal terminal.

22. The wrist-worn electronic device of claim 12, further comprising a third electrically conductive tab extending from an inner circumference of the bezel and a third electrically conductive spring contact positioned in the internal cavity, wherein the electrical connection between the bezel and first electronic signal terminal is formed by the third electrically conductive spring contact being electrically connected to the third tab and the first electronic signal terminal.

23. The wrist-worn electronic device of claim 20, further comprising:
a second antenna formed by a second portion of the circumference of the bezel between two of the electrical ground terminals associated with the second antenna, and
a communication element positioned on the printed circuit board and configured to transmit to or receive from the second antenna a second electronic signal to communicate with another electronic device or a communication network;
wherein the printed circuit board includes a second electronic signal terminal electrically connecting the second antenna and the communication element.

24. The wrist-worn electronic device of claim 23, wherein the second antenna is formed by a second nonconductive slot formed by the second portion of the circumference of the bezel, a perimeter of the printed circuit board corresponding to the second portion of a circumference of the bezel, and the electrical connections between the bezel and the two electrical ground terminals associated with the second antenna.

25. The wrist-worn electronic device of claim 24, wherein the two electrical ground terminals associated with the second antenna are different than the two electrical ground terminals associated with the first antenna.

26. The wrist-worn electronic device of claim 3, wherein the second antenna is formed by a second nonconductive slot formed by the second portion of the circumference of the bezel, a perimeter of the printed circuit board corresponding to the second portion of a circumference of the bezel, and the electrical connections between the bezel and the two electrical ground terminals associated with the second antenna.

27. The wrist-worn electronic device of claim 26, wherein the two electrical ground terminals associated with the second antenna are different than the two electrical ground terminals associated with the first antenna.

28. The wrist-worn electronic device of claim 17, wherein the second antenna is formed by a second nonconductive slot formed by the second portion of the circumference of the bezel, a perimeter of the printed circuit board corresponding to the second portion of a circumference of the bezel, and the electrical connections between the bezel and the two electrical ground terminals associated with the second antenna.

29. The wrist-worn electronic device of claim 28, wherein the two electrical ground terminals associated with the second antenna are different than the two electrical ground terminals associated with the first antenna.

* * * * *